Sept. 27, 1932.   E. SWANSON   1,879,860
HEDGE TRIMMING SHEARS
Filed Aug. 5, 1931   2 Sheets-Sheet 1
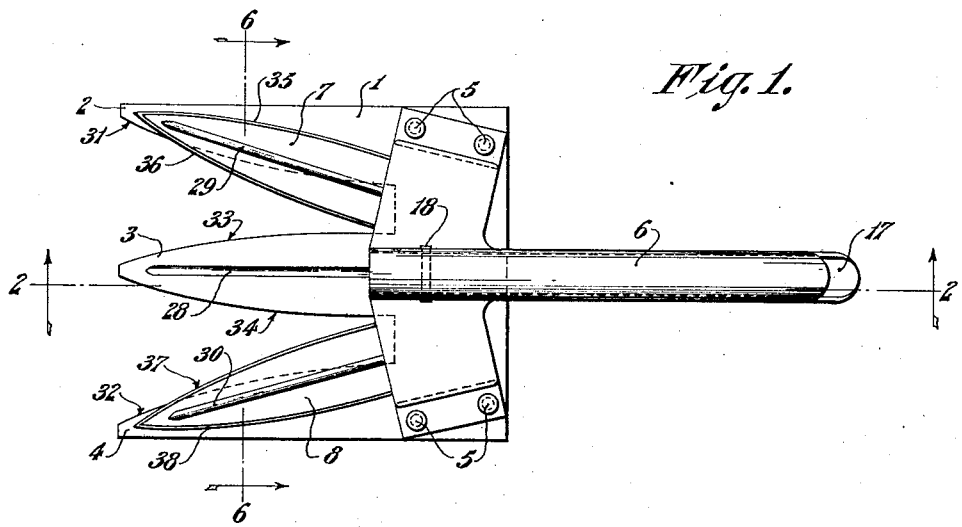
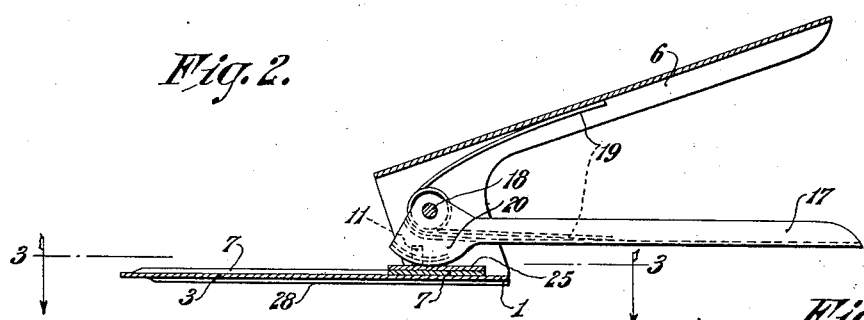
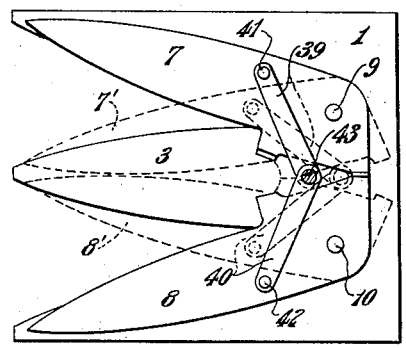
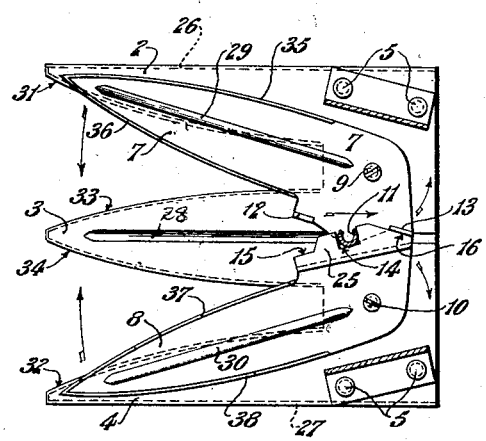
INVENTOR,
Ernest Swanson,
BY
Harry W. Bowen.
ATTORNEY.

Sept. 27, 1932.   E. SWANSON   1,879,860
HEDGE TRIMMING SHEARS
Filed Aug. 5, 1931   2 Sheets-Sheet 2
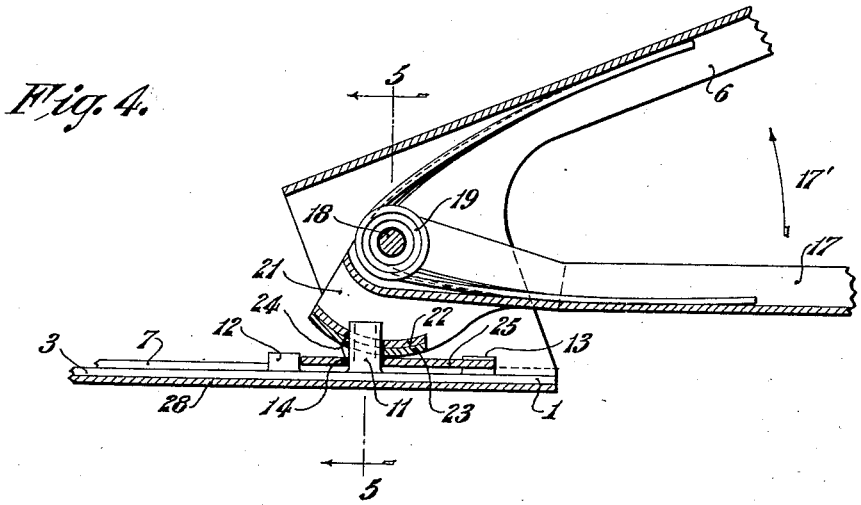
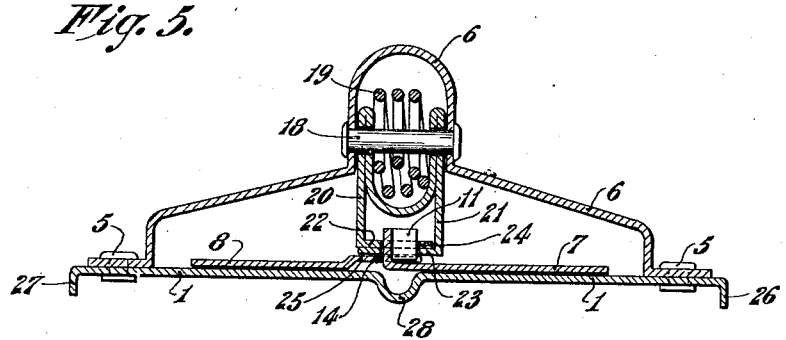
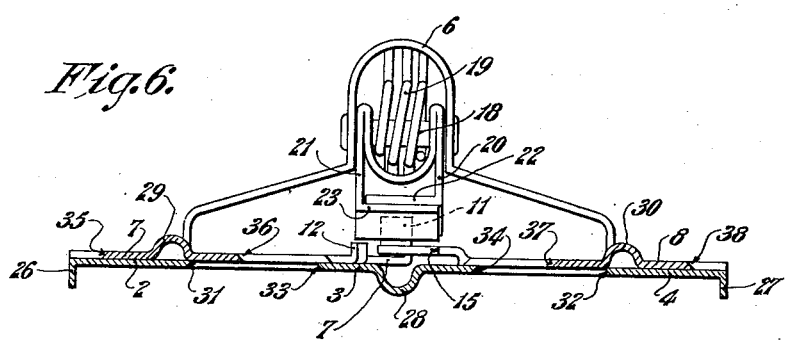
INVENTOR,
Ernest Swanson,
BY
Harry W. Bowen.
ATTORNEY.

Patented Sept. 27, 1932

1,879,860

UNITED STATES PATENT OFFICE

ERNEST SWANSON, OF SPRINGFIELD, MASSACHUSETTS

HEDGE TRIMMING SHEARS

Application filed August 5, 1931. Serial No. 555,213.

My invention relates to improvements in hedge trimming shears, and more particularly to that type of trimming shears which are double-acting and designed for hedge or lawn trimming purposes.

An object of my invention is to provide a shears construction which will readily accomplish several times the amount of work that ordinary shears do, now in general use, with practically the same amount of energy expended by reason of the double action construction.

Broadly, my invention comprises two pivoted and movable blades operating in co-operation with three stationary blades, the stationary blades being an integral part of a supporting base plate and the movable blades being operated by the lower one of a pair of handles moving in a vertical plane relative to the horizontal movement of the movable blades. Each of the movable blades is formed with a double-cutting edge, and so arranged as to engage alternately with the cutting edges of two of the stationary blades.

A preferred form of my invention is illustrated in the accompanying drawings, in which:

Fig. 1 is a plan view of the device showing the normal relation of the two movable and stationary blades.

Fig. 2 is a vertical, sectional, view on the line 2—2 of Fig. 1.

Fig. 3 is a sectional, plan view on the line 3—3 of Fig. 2, showing the means for operating the blades and for limiting their movements in both directions.

Fig. 4 is a detail, sectional, view illustrating the co-operating means between the lower handle and the movable blades.

Fig. 5 is a cross, sectional, view on the line 5—5 of Fig. 4,

Fig. 6 is a cross, sectional, view on the line 6—6 of Fig. 1. and

Fig. 7 is a modification

Referring now to the drawings in detail, in which like numerals refer to like parts throughout:

The base member 1 is formed with the three integral blade members 2, 3, and 4, and secured thereto by the rivets 5 is the upper, fixed handle 6. The two movable blades 7 and 8 are pivotally secured to the base 1 by means of the bolts 9 and 10. The blade 7 is formed with the integral struck-up lug 11 and the two stop lugs 12 and 13. The blade 8 is formed with the notch, or recess 14, in which is located the lug 11 of the blade 7 and the stop faces 15 and 16 which are engaged by the two stop lugs 12 and 13 respectively of the blade 7, when the blades are operated, as will be described.

The lower handle 17 is pivotally secured to the upper handle 6 by the pin 18, which forms a bearing for the heavy, expansive V-shaped spring 19. The lower handle 17 is formed with the downwardly extending portions 20 and 21, which are bent inwardly and overlapped at 22 and 23. (See Fig. 5.) The lapped portions 22 and 23 are formed with the opening 24, through which the lug 11 of the blade 7 projects.

The blade 8 is formed with the upwardly extending offset portion 25, to permit this portion of the blade 8 to slide freely over the corresponding portion of the blade 7, as the blades 7 and 8 are operated.

The base member 1, and the stationary sharpened blades 2, 3, and 4 are each reinforced by the downwardly extending flanges 26 and 27 and the downwardly projecting rib 28. The movable blades 7 and 8 are reinforced by the centrally disposed, upwardly projecting, ribs 29 and 30, respectively.

The stationary blades 2 and 4 are formed with the cutting edges 31 and 32, respectively, and the stationary, central blade 3 is formed with the cutting edges 33 and 34. The movable blades 7 and 8 are formed with the cutting edges 35, 36, 37, and 38.

In operation, when the lower, movable handle 17 is moved towards the fixed handle 6 by raising the lower handle 17, as indicated by the arrow 17′ in Fig. 4, the overlapping flanges 22 and 23 are then moved backward around the pin 18, as a center, thus forcing the lug 11 in the recess 14 backward. The movable blades 7 and 8 are thus caused to be moved together, pivoting around the bolts 9 and 10. This action is reversed, when pressure on the movable handle 17 is released, due to the action of the spring 19. In their closing movement, the cutting edges 36 and 37 of the movable blades 7 and 8 act against the cutting edges 33 and 34, respectively, of the stationary blade 3. In the opening movements of the movable blades 7 and 8, the cutting edges 35 and 38 act against the cutting edges 31 and 32 of the stationary blades 2 and 4, respectively. The closing movement of the blades 7 and 8 is limited by the engagement of the stop lug 12 against the stop face 15, and the opening movement of the blades 7 and 8, due to the action of the spring 19, limited by the engagement of the stop lug 13 against the stop face 16. (See Fig. 3.)

Referring now to Fig. 7 in which the movable or cutter blades 7 and 8 are operated with the two toggle links 39 and 40 which are pivotally connected to the blades at 41 and 42 and are connected together with the pivot pin 43. This pin is located in the opening 24 of the two overlapping parts 22 and 23 of the movable handle 17, and therefore operates the blades 7 and 8, when this handle is moved upward or downward. This construction obviates the use of such a stiff spring as used in the other construction. It provides on the return movement a greater leverage on the cutter blades at their extreme outward movement by reason of the toggle lever effect. The dotted line positions show the blades when in their closed positions relative to the fixed middle blade 3. Otherwise the action is the same as in the other figures.

From this description, it will be seen that I have provided a double-acting shears construction that is simple in construction, efficient in operation and comparatively inexpensive to construct.

What I claim is:

1. A double action trimming shears comprising, in combination, a base member formed with two outer blades reinforced at their outer edges by downwardly folded integral flanges and a centrally disposed blade reinforced by a centrally disposed rib, a pair of movable blades each one of which is pivotally secured to said base member and each formed with two sharpened edges, one of said movable blades being formed with an integral upwardly extending lug portion and the other of said movable blades being formed with a notch, or recess, in which said lug is located to operatively connect the movable blades together, a stationary handle secured to said base member, a movable handle pivotally secured to said stationary handle, spring means engaging said stationary handle, and said movable handle to maintain them in a normally open position, and downwardly extending overlapped portions on said movable handle formed with an opening in which said lug is engaged, whereby when the movable handle is operated the pair of movable blades will be operated, as described.

2. A double action trimming shears comprising a base member formed with a pair of outer blades and a centrally disposed blade, a pair of movable blades each one of which is pivotally secured to said base member, one of said movable blades being formed with an upwardly extending lug member and integral upwardly extending stop lugs and the other of said movable blades being formed with a notch in which the lug member is located and stop faces for limiting the outward and inward movement of said movable blades when engaged by said stop lugs, a stationary handle secured to said base member, a movable handle pivotally secured to said stationary handle, spring means engaging said handles to maintain them in a normally open position, and an extended portion on said movable handle formed with an opening in which said lug member is engaged, whereby said movable blades are moved across the blades on the base member when said movable handle is actuated.

3. A shears construction comprising a base member having a plurality of blades, a plurality of cutting blades pivotally secured to the base member, a lug and recess construction formed on the cutting blades for moving one blade from the other, a movable handle pivotally secured to the base member and formed with an opening in which the said lug is located for moving the cutting blades from the movable handle.

ERNEST SWANSON.